(12) United States Patent
Imani et al.

(10) Patent No.: US 11,599,832 B2
(45) Date of Patent: Mar. 7, 2023

(54) SYSTEMS, CIRCUITS AND COMPUTER PROGRAM PRODUCTS PROVIDING A FRAMEWORK FOR SECURED COLLABORATIVE TRAINING USING HYPER-DIMENSIONAL VECTOR BASED DATA ENCODING/DECODING AND RELATED METHODS

(71) Applicant: The Regents of the University of California, Oakland, CA (US)

(72) Inventors: Mohsen Imani, San Diego, CA (US); Yeseong Kim, La Jolla, CA (US); Tajana Rosing, San Diego, CA (US); Farinaz Koushanfar, La Jolla, CA (US); Mohammad Sadegh Riazi, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 235 days.

(21) Appl. No.: 16/915,643

(22) Filed: Jun. 29, 2020

(65) Prior Publication Data
US 2020/0410404 A1    Dec. 31, 2020

Related U.S. Application Data

(60) Provisional application No. 62/867,620, filed on Jun. 27, 2019.

(51) Int. Cl.
*G06N 20/20* (2019.01)
*H04L 9/08* (2006.01)

(52) U.S. Cl.
CPC ............. *G06N 20/20* (2019.01); *H04L 9/085* (2013.01); *H04L 9/0819* (2013.01)

(58) Field of Classification Search
None
See application file for complete search history.

(56) References Cited

U.S. PATENT DOCUMENTS

2013/0080641 A1\* 3/2013 Lui ................. H04L 41/0886
709/226
2015/0089243 A1\* 3/2015 Veugen ............... H04L 9/008
713/190

(Continued)

OTHER PUBLICATIONS

Wójcik, P.I., Kurdziel, M. Training neural networks on high-dimensional data using random projection. Pattern Anal Applic 22, 1221-1231 (Published 2018). https://doi.org/10.1007/s10044-018-0697-0 (Year: 2018).\*

(Continued)

*Primary Examiner* — Saleh Najjar
*Assistant Examiner* — Shadi H Kobrosli
(74) *Attorney, Agent, or Firm* — Stanek Lemon Crouse & Meeks, P.A.

(57) ABSTRACT

A computing system can include a plurality of clients located outside a cloud-based computing environment, where each of the clients may be configured to encode respective original data with a respective unique secret key to generate data hypervectors that encode the original data. A collaborative machine learning system can operate in the cloud-based computing environment and can be operatively coupled to the plurality of clients, where the collaborative machine learning system can be configured to operate on the data hypervectors that encode the original data to train a machine learning model operated by the collaborative machine learning system or to generate an inference from the machine learning model.

19 Claims, 15 Drawing Sheets

(56) References Cited

U.S. PATENT DOCUMENTS

2020/0285980 A1* 9/2020 Sharad .................. G06N 20/20
2020/0380384 A1* 12/2020 Karunaratne .......... G06N 20/00
2022/0108177 A1* 4/2022 Sam ..................... G06N 3/0454

OTHER PUBLICATIONS

Keith Bonawitz, Vladimir Ivanov, Ben Kreuter, Antonio Marcedone, H. Brendan McMahan, Sarvar Patel, Daniel Ramage, Aaron Segal, and Karn Seth. Practical Secure Aggregation for Privacy-Preserving Machine Learning. pp. 1-21 (Year: 2017).*

Kanerva, P. Hyperdimensional Computing: An Introduction to Computing in Distributed Representation with High-Dimensional Random Vectors. Cogn Comput 1, 139-159 (Year: 2009).*

Bonawitz et al., *Practical Secure Aggregation for Privacy-Preserving Machine Learning*, CCS'17, Session E5: Privacy-Preserving Analytics, Oct. 30-Nov. 3, 2017, 17 pages.

Hitaj et al., *Deep Models Under the GAN: Information Leakage from Collaborative Deep Learning*, CCS'17, Session C3: Machine Learning Privacy, Oct. 30-Nov. 3, 2017, 16 pages.

Mohassel et al., *SecureML: A System for Scalable Privacy-Preserving Machine Learning*, IEEE Symposium on Security and Privacy (2017), 20 pages.

Riazi et al., *Chamelon: A Hybrid Secure Computation Framework for Machine Learning Applications*, ASIACCS' 18, Session 17: Machine Learning 2, Jun. 2018, 15 pages.

Riazi et al., *Deep Learning on Private Data*, IEEE Security & Privacy, Nov./Dec. 2019, 10 pages.

* cited by examiner

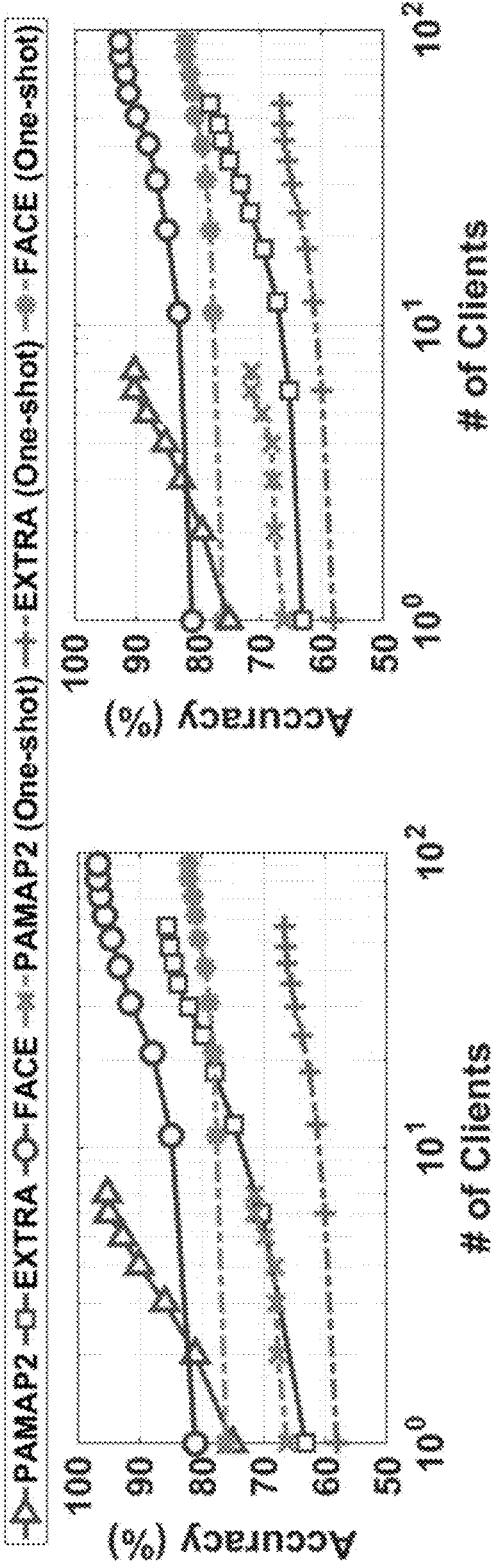
Figure 12A
Figure 12B
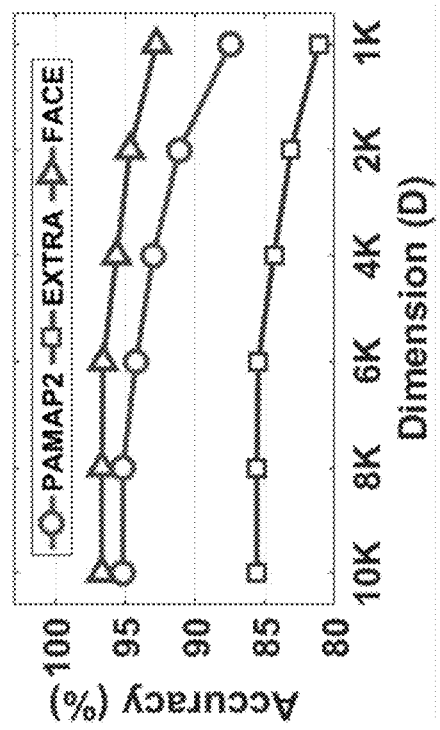
Figure 12D
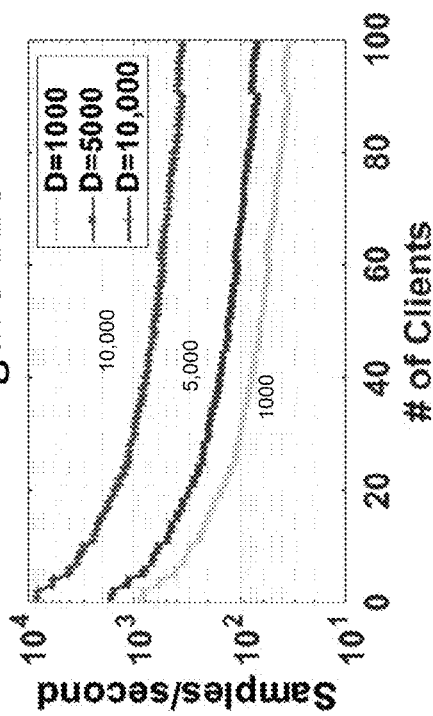
Figure 12C

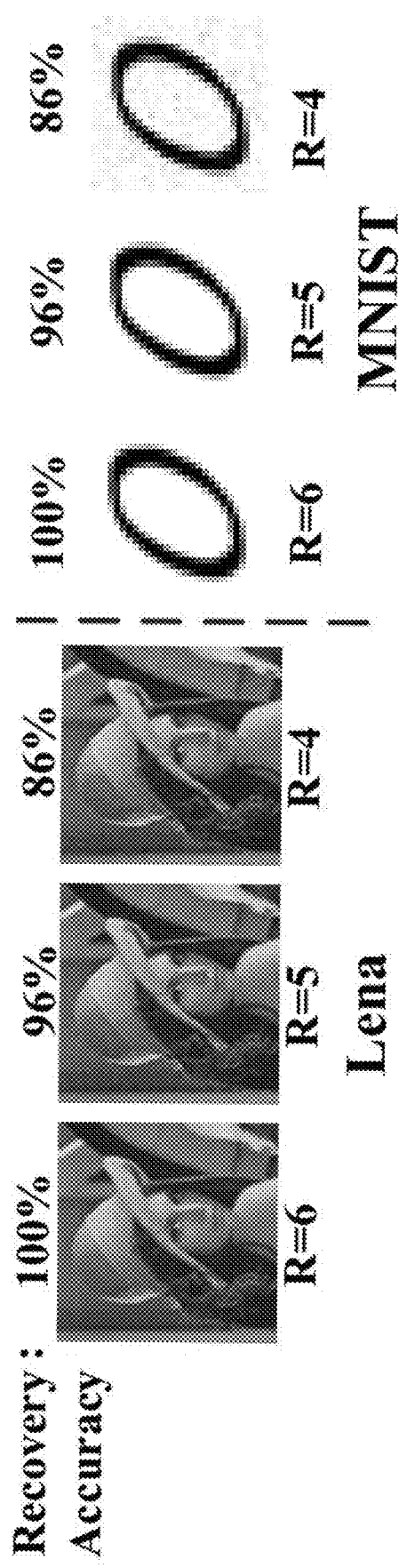
Figure 14
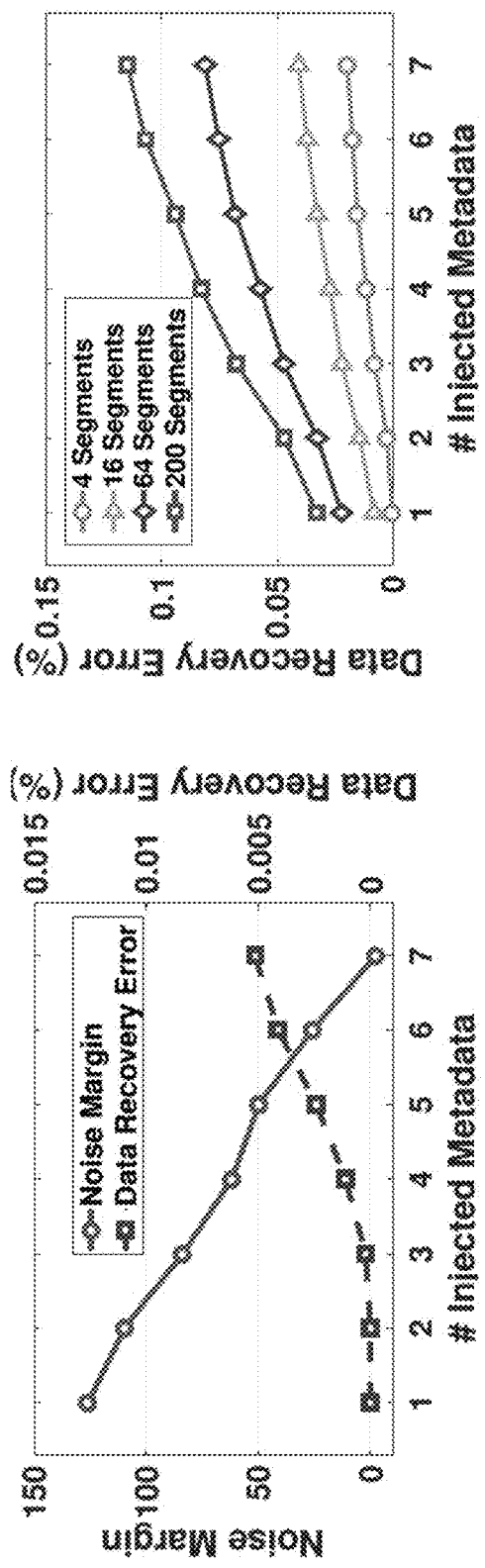
Figure 15A Single Segment
Figure 15B Multiple Segments

SYSTEMS, CIRCUITS AND COMPUTER PROGRAM PRODUCTS PROVIDING A FRAMEWORK FOR SECURED COLLABORATIVE TRAINING USING HYPER-DIMENSIONAL VECTOR BASED DATA ENCODING/DECODING AND RELATED METHODS

CLAIM FOR PRIORITY

This application claims priority to Provisional Application Ser. No. 62/867,620, filed on Jun. 27, 2019 titled A Framework for Collaborative Learning in Secure High-Dimensional Space, the entire disclosure of which is hereby incorporated herein by reference.

STATEMENT OF GOVERNMENT SUPPORT

This invention was made with government support under Grant Nos. 1730158 and 1527034 awarded by the National Science Foundation. The government has certain rights in the invention.

BACKGROUND

Internet of Things (IoT) applications often analyze collected data using machine learning algorithms. As the amount of the data keeps increasing, many applications send the data to powerful systems, e.g., data centers, to run the learning algorithms. On the one hand, sending the original data is not desirable due to privacy and security concerns. On the other hand, many machine learning models may require unencrypted (plaintext) data, e.g., original images, to train models and perform inference. When offloading theses computation tasks, sensitive information may be exposed to the untrustworthy cloud system which is susceptible to internal and external attacks. In many IoT systems, the learning procedure should be performed with the data that is held by a large number of user devices at the edge of Internet. These users may be unwilling to share the original data with the cloud and other users if security concerns cannot be addressed.

An existing strategy applicable to this scenario exploits Homomorphic Encryption (HE). HE encrypts the raw data and allows certain operations to be performed directly on the ciphertext without decryption. However, this approach can significantly increase the computation burden and costly learning procedures. For example in one case, Microsoft SEAL, a state-of-the-art homomorphic encryption library, took about 14 days to encrypt all of the 28×28 pixel images in the MNIST dataset, and increased the data size by 28 times. More recently, another case presented a protocol that enabled training Deep Neural Networks (DNN) when data is distributed over different users. In this technique, the users' devices performed the DNN training task locally to update the global model.

FIG. 1 shows a conventional approach where clients, e.g., user devices, send either their sensitive data or partially trained models in an encrypted form to the cloud. The cloud performs a learning task by collecting the encrypted information received from the multiple clients. When requested by the user, the cloud sends back the encrypted data to clients. The client then decrypts the data with a private key.

Homomorphic encryption also enables processing on the encrypted version of data. FIG. 2 shows the execution time of a state-of-the-art homomorphic encryption library, Microsoft SEAL, for MNIST training dataset, which includes 60000 images of 28'28 pixels. The library was executed on two platforms that a client in IoT systems may use: a high-performance computer (Intel i7-8700K) and a Raspberry Pi 3 (ARM Cortex A53). The result shows that, even with the simple dataset of 47 MBytes, it takes significantly large execution time, e.g., more than 13 days on ARM to encrypt.

Another approach is to utilize secure Multi-Party Computation (MPC) techniques. In theory, any function, which can be represented as a Boolean circuit with inputs from multiple parties, can be evaluated securely without disclosing each party's data to another. For example, by describing the machine learning algorithm as a Boolean circuit with learning data as inputs to the circuit, one can securely learn the model. However, such solutions are very costly in practice and are computation and communication intensive.

SUMMARY

Embodiments according to the invention can provide systems, circuits and computer program products providing a framework for secured collaborative training using hyper-dimensional vector based data encoding/decoding and related methods. Pursuant to these embodiments, a computing system can include a plurality of clients located outside a cloud-based computing environment, where each of the clients may be configured to encode respective original data with a respective unique secret key to generate data hyper-vectors that encode the original data. A collaborative machine learning system can operate in the cloud-based computing environment and can be operatively coupled to the plurality of clients, where the collaborative machine learning system can be configured to operate on the data hypervectors that encode the original data to train a machine learning model operated by the collaborative machine learning system or to generate an inference from the machine learning model.

BRIEF DESCRIPTION OF THE FIGURES

FIG. 12A-12D are graphs showing Scalability of SecureHD classification in some embodiments according to the present invention.

FIG. 14 is an example of image recovery using SecureHD in some embodiments according to the present invention.

FIGS. 15A and 15 B are graphs showing Data recovery rate for different settings of metavector injection in some embodiments according to the present invention.

DETAILED DESCRIPTION OF EMBODIMENTS ACCORDING TO THE INVENTION

Figure 1:
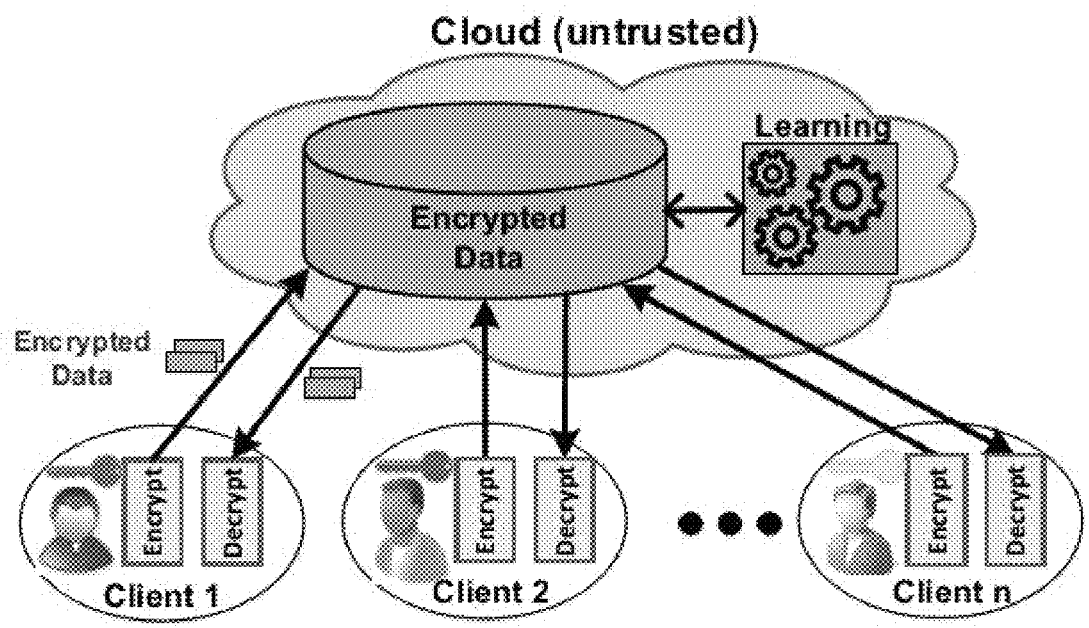
FIG. 1 is a schematic illustration of a conventional HD computing system.
Figure 2:
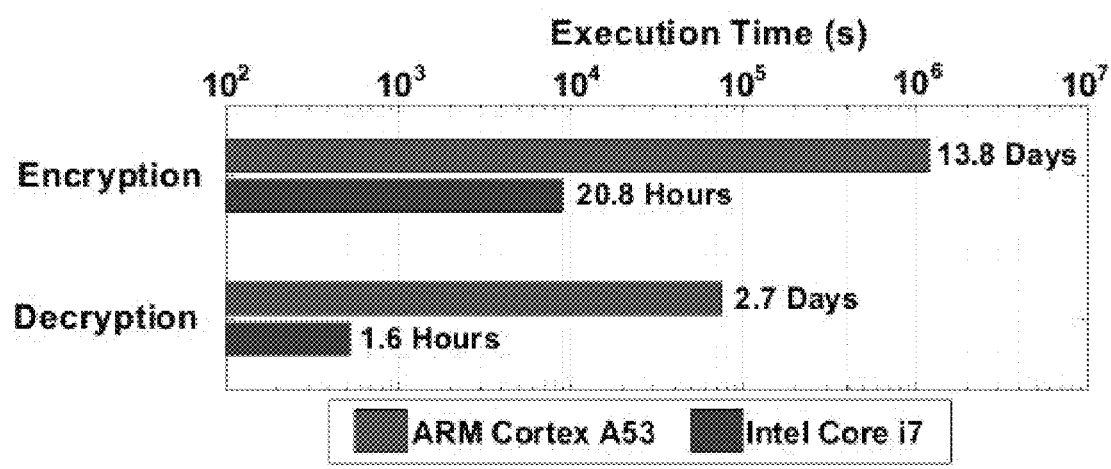
FIG. 2 is performance data associated with execution time of homomorphic encryption and decryption over MNIST dataset.

As appreciated by the present inventors, as the amount of data generated by the Internet of the Things (IoT) devices keeps increasing, many applications may need to offload computation to the cloud. However, it often entails risks due to security and privacy issues. Encryption and decryption methods add to an already significant computational burden to this type of approach. Accordingly, a framework, sometimes referred to herein as SecureHD, which can provide a secure learning solution based on the application of high-dimensional (HD) computing.

As described herein, in some embodiments according to the present invention, original data can be encoded as secure, high-dimensional vectors, which can be used to train a model. Thus, applications can send their data to the cloud in a secured form, while the cloud can perform the offloaded tasks without additional decryption steps. In particular, SecureHD can be used to implement classification methods suitable to handle a large amount of data that the cloud typically processes. In addition, SecureHD can recover the encoded data in a lossless manner. As described herein, the SecureHD framework can perform the encoding and decoding tasks 145.6 times and 6.8 times faster, respectively, than an encryption/decryption library running on in a conventional system. In addition, embodiments according the present invention can provide accuracy of about 95% on average for diverse practical classification tasks including cloud-scale datasets.

In some embodiments according the present invention, High-Dimensional (HD) computing can be used to perform the learning tasks in a secure domain, rather than using a conventional machine learning approach. HD computing may not require complete knowledge for the original data (compared to the needs of conventional learning approaches), rather HD may run with a mapping function that encodes given data to a high-dimensional space that mimics massive numbers of neurons and synapses in brains. The original data cannot be reconstructed from the mapped data without the mapping function, since a single value can be represented with huge possibilities in the high-dimensional space.

Along with the attractive properties for secure learning, HD computing also offers additional benefits. For example, HD provides an efficient learning strategy without complex computations such as back propagation in neural networks. In addition, the HD-based learning models are tolerant of hardware failures due to the independency of dimensions in the computation. Further HD computing can be applied to many cognitive tasks such as analogy-based reasoning, latent semantic analysis, language recognition, and speech/object recognition. Accordingly, embodiments according the present invention may be applied to many areas applicable to solving cognitive like tasks.

As further appreciated buy the present inventors, several technical challenges have been addresses using embodiments according the present invention to enable HD-based trustworthy, collaborative learning. Accordingly, embodiments according to the present invention can be utilized to provide the following approaches:

A secure collaborative learning protocol that securely generates and distributes public and secret keys. SecureHD utilizes Multi-Party Computation (MPC) techniques which are proven to be secure when each party is untrusted. With the generated keys, the user data are not revealed to the cloud server, while the server can still learn a model based on the data encoded by users. Since MPC is may be an expensive protocol, the present framework can be used to replace some use of MPC with e two-party computation. In addition, SecureHD leverages MPC only for a one-time key generation operation. The remaining operations such as encoding, decoding, and learning may be performed without using MPC.

In some embodiments according the present invention, the encoding method can be used to map the original data with the secret key assigned to each user. Unlike conventional HD encoding functions, embodiments according the present invention can encode both the data and the metadata, e.g., data types and color depths, in a recover-friendly manner. Since the secret key of each user is not disclosed, other user's encoded data cannot be decoded, although encoded data of other users may be known.

SecureHD can provide a robust decoding method for the authorized user who has the secret key. In some embodiments according the present invention, the cosine similarity metric, widely used in HD computing, is not suitable to recover the original data. Further in some embodiments according the present invention, the decoding can recover the encoded data in a lossless manner through an iterative procedure.

In some embodiments according the present invention, scalable HD-based classification systems can be provided for many practical learning problems which utilize the collaboration of many users, e.g., human activity and face image recognition. Further, two collaborative learning approaches (a cloud-centric learning for the case that end-node devices do not have enough computing capability, and an edge-based learning that all the user devices participate in secure distributed learning) are disclosed. Also disclosed is a hardware accelerator design that significantly minimizes the costs paid for security. This allows the SecureHD computing even on less-powerful edge devices, e.g., gateways, which need to encrypt and decrypt data.

As further described herein SecureHD can be implemented on diverse computing devices in IoT systems, including a gateway-level device, a high-performance system, and the present hardware accelerator. In evaluations described herein, the proposed framework performed the encoding and decoding tasks 145.6 times and 6.8 times faster, respectively, than a conventional homomorphic encryption library running on the Intel i7-8700K. In some embodiments according the present invention utilizing a hardware accelerator further improved the performance efficiency by 35.5 times and 20.4 times as compared to the CPU-based encoding and decoding of SecureHD. In addition, embodiments according the present invention, can provide high accuracy and scalability for diverse practical problems, successfully performing learning tasks with 95% average accuracy for six real-world workloads, ranging from datasets collected in a small IoT network, e.g., human activity recognition, to a large dataset which includes hundreds of thousands of images for the face recognition task. In some embodiments according the present invention, systems also provided data recovery of encoded data in a lossless manner, where the size of the encoded data was 4 times smaller than the data encrypted by the state-of-the-art homomorphic encryption library.

Brain-inspired high-dimensional (HD) computing performs cognitive tasks using ultra-wide words—that is, with very high-dimensional vectors, also known as hypervectors. Hypervectors are holographic and (pseudo)random with independent identically distributed (i.i.d.) components. A hyper-vector may contain multiple values by spreading them across its components in a full holistic representation. In this case, no component in a hypervector is more responsible to store any piece of information than others. These unique features make hypervectors robust against errors in their components.

Hypervectors are implemented with high-dimensional operations, such as binding that forms a new hypervector which associates two hypervectors, and bundling that combines hypervectors into a single composite hypervector. The binding of two hypervectors A and B is denoted as A*B where the result of the operation is a new hypervector that is dissimilar to its constituent vectors. For bipolar hypervectors ($\{-1, +1\}^D$), the component-wise multiplication performs the binding operation. For example, if two hypervectors are randomly generated, i.e., each component has either −1 or +1 with 50:50 chance, as the hypervectors are near-orthogonal their binding has approximately zero similarity to one another, i.e., $\delta$ (A*B,A)≈0 where $\delta$ is a function that computes the cosine similarity. A bundling operation is denoted as A⊙B and preserves similarity to its component hypervectors. The component-wise addition implements the bundling for bipolar hypervectors. For example, the bundling of two random hypervectors keeps information, i.e., $\delta$ (A⊙B,A)≈cos ($\pi/4$).

To implement a simple classification algorithm, a data point in a given training dataset is first converted into a hypervector. This step is often referred to as encoding. The encoding exploits a set of orthogonal hypervectors, called base hypervectors, to map each data point into the HD space. Then, it bundles the encoded hypervectors for each class. The reasoning (inference) can be performed by choosing the class whose bundled hypervector presents the highest similarity to an unseen hypervector.

In embodiments according to the present invention, server and other clients are assumed to be untrusted. In particular, an Honest-but-Curious (HbC) adversary model is utilized where each party, server or a client, is untrusted but follows the protocol. Both the server and other clients are not able to extract any information based on the data that they receive and send during the secure computation protocol. For the task of key generation and distribution, a secure MPC protocol is utilized which is proven to be secure in the HbC adversary model. A two-party Yao's Garbled Circuits (GC) protocol is also employed in the HbC adversary model. The intermediate results are stored as additive unique shares of a unique secret key (PKey) by each client and the server.

Figure 3:
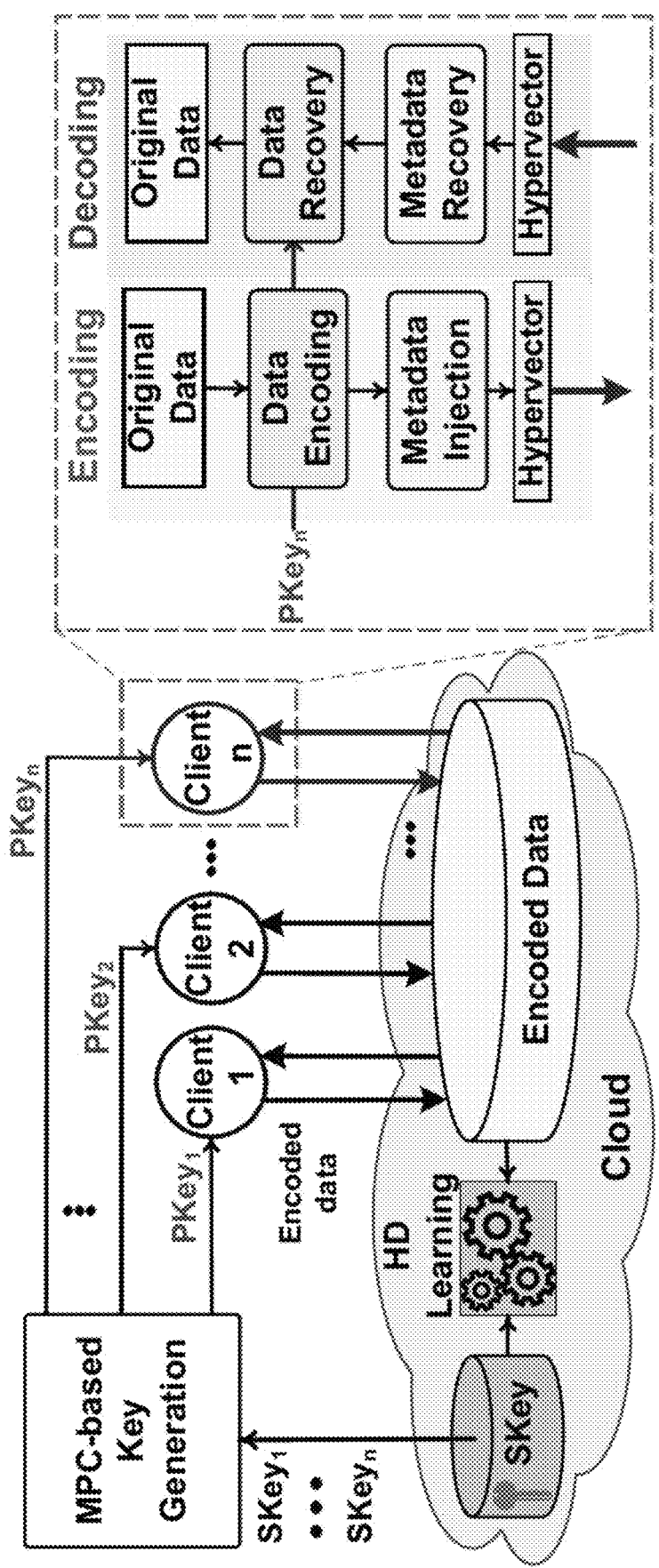
FIG. 3 is a schematic illustration of a SecureHD system in some embodiments according to the present invention.

FIG. 3 illustrates an overview of a SecureHD system and method in some embodiments according to the invention. The first step is to create different keys for each user and cloud-based on an MPC protocol. As described herein, to perform a HD learning task, the data are encoded with a set of base hypervectors. The MPC protocol creates the base hypervectors for the learning application, called global keys (GKeys). Instead of sharing the original GKeys with clients, the server distributes permutations of each GKey, i.e., a hypervector whose dimensions are randomly shuffled. Since each user has different permutations of GKeys, called personal keys (PKeys), users cannot decode the encoded data of others. The cloud has dimension indexes used in the GKey shuffling, called shuffling keys (SKeys). Since the cloud does not have the GKeys, it cannot decrypt the encoded data of clients. This MPC-based key generation runs only once.

After the key generation, each client can encode their data with its PKeys. SecureHD securely injects a small amount of information into the encoded data. In some embodiments according to the invention, this technique is used to store the metadata, e.g., data types, which are important to recover the entire original data. Once the encoded data is sent to the cloud, the cloud reshuffles the encoded data with the SKeys for the client. This allows the cloud to perform the learning task with no need for accessing GKeys and PKeys. With the SecureHD, the client can also decode the data from the encoded hypervectors. For example, once a client fetches the encoded data from the cloud storage service, it can exploit SecureHD to recover the original data using its own PKeys. Each client may also utilize the specialized hardware to accelerate both the encoding and decoding procedures.

Figure 4:
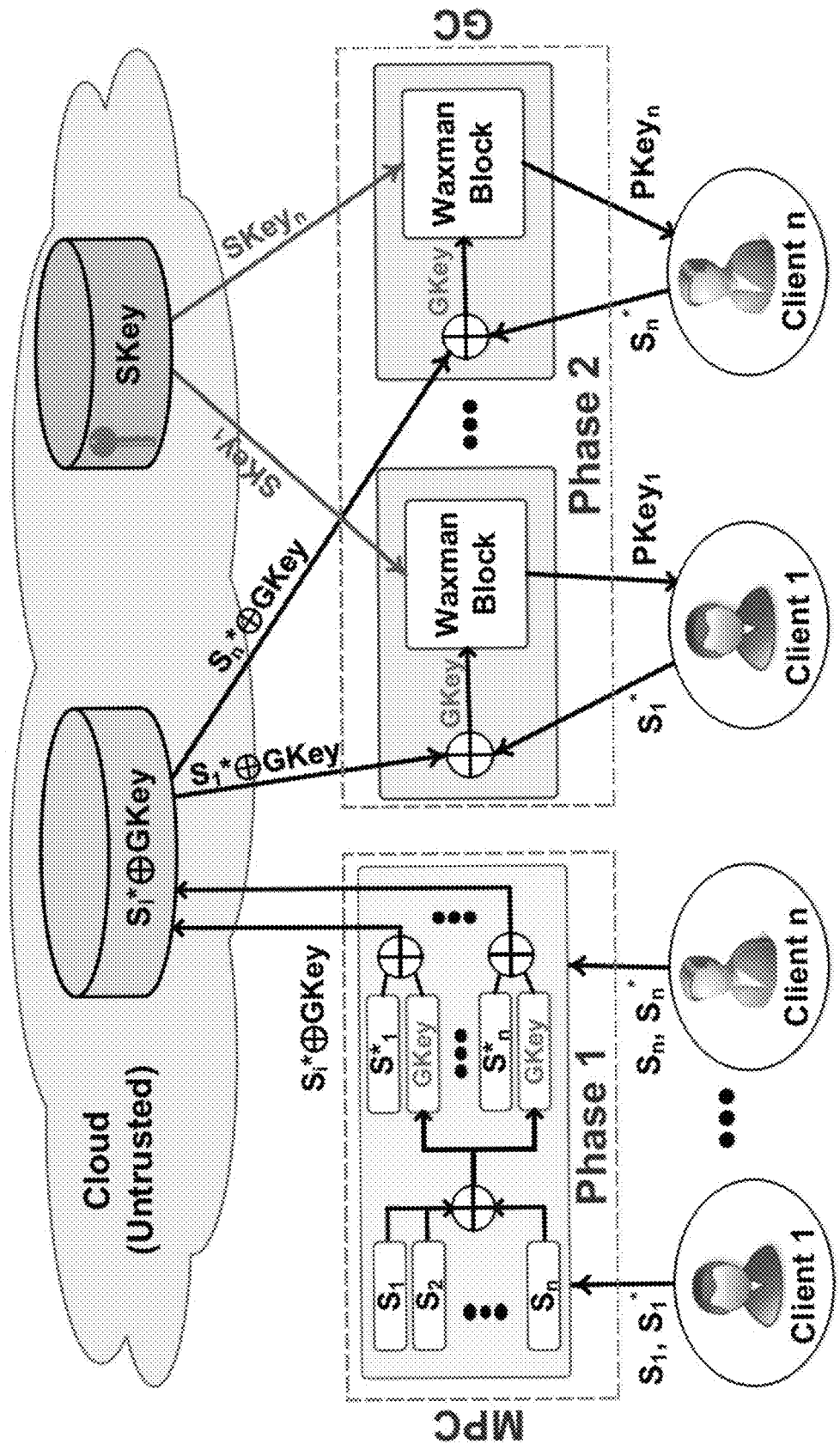
FIG. 4 is a schematic illustration of a key generation system in some embodiments according to the present invention.

FIG. 4 illustrates how SecureHD can securely create the key hypervectors in some embodiments according to the invention. The protocol runs two phases: Phase 1 where all clients and the cloud participate, and Phase 2 where two parties, a single client and the cloud, participate. Recall that in order for the cloud server to learn the model, all data is projected based on the same base hypervectors. Given the base hypervector and the encoded result, one can reconstruct the plaintext data. Therefore, all clients use the same key without any other party having access to the client's base hypervectors.

In the first phase, the base hypervectors are generated and denoted as GKey. In some embodiments, the base hypervectors are generated collaboratively inside the secure Multi-Party Computation (MPC) protocol. At the beginning of the first phase, each party i inputs two sets of random strings called $S_i$ and $S^*_i$. Each stream length is D, where D is the dimension size of a hypervector. The MPC protocol computes element-wise XOR (⊕) of all the provided bitstreams, and the substream of D elements represent the global base hypervector, i.e., GKey. Then, it performs XOR for the GKeys again with $S^*_i$ provided by each client. At the end of the first MPC protocol phase, the cloud receives $S^*_i$⊕GKey corresponding to each user i and stores these secret keys. Note that since $S_i$ and $S^*_i$ are inputs from each user to the MPC protocol, it is not revealed to any other party during the joint computation. It can be seen that the server has a unique XOR-share of the global key GKey for each user. This, in turn, enables the server and each party to continue their computation in a point-to-point manner without involving other parties during the second phase.

This approach provides a strong property that even if all other clients are dishonest and provide zero vectors as their share to generate the Gkey, the security of the system is not hindered. The reason is that the Gkey is generated with XOR of Si for all clients. That is, if one generates its seed randomly, the global key will have uniform random distribution. In addition, the server only receives an XOR-share of the global key. XOR gates can be used in the MPC protocol which are considerably less costly than non-XOR gates.

In the second phase, the protocol distributes the secret key for each user. Each party engages in a two-party secure computation using the GC protocol. Server's inputs are SKeyi and $S^*_i \oplus GKey$, while the client's input is $S^*_i$. The global key GKey is securely reconstructed inside the GC protocol by XOR of the two shares: $GKey = S^*_i \oplus (S^*_i \oplus GKey)$. The global key is then shuffled based on the unique permutation bits held by the server (SKeyi). In order to avoid costly random accesses inside the GC protocol, a Waxman permutation network can be used with SKeyi being the permutation bits. The shuffled global key is sent back to the user, and a single rotational shift can be performed for the GKey to generate the next base hypervector. This can be repeated n times where n is the required number of base hypervectors, e.g., the feature size. The permuted base hypervectors serve as user's personal keys, called PKey, for the projection. Once a user performs the projection with PKey, the user can send the result to the server, and the server permutes back based on the SKeyi for the learning process.

Figure 5:
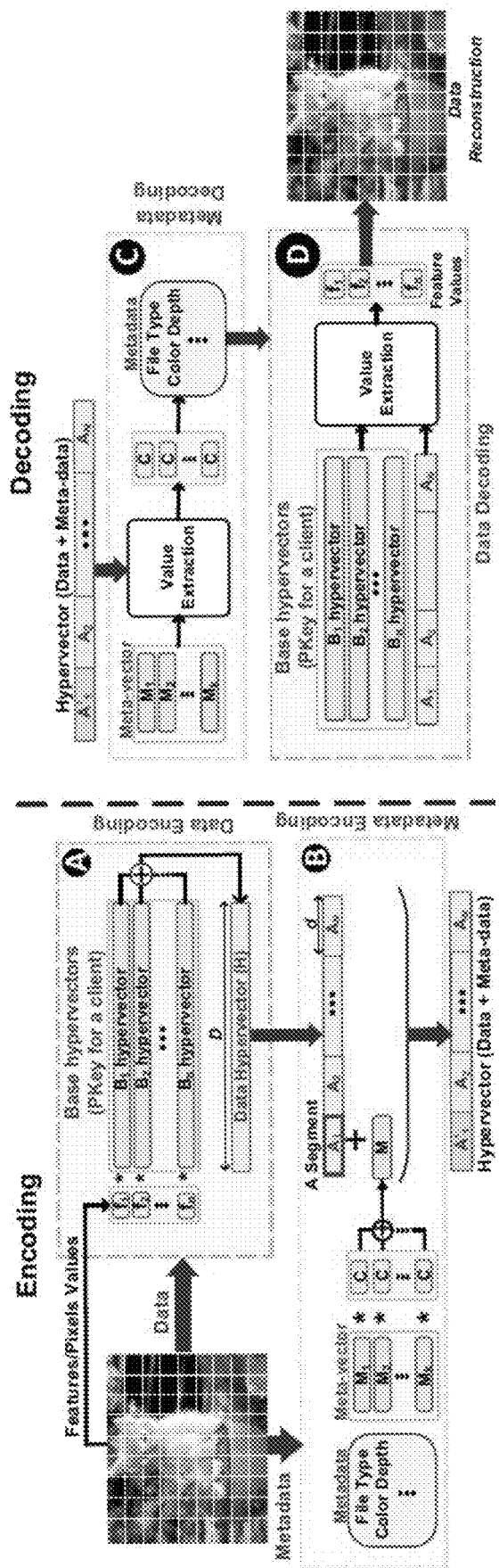
FIG. 5 is a schematic illustration of SecureHD system encoding and decoding operations in some embodiments according to the present invention.

FIG. 5 shows methods and systems providing a SecureHD framework performing encoding and decoding on a client with the generated PKeys in some embodiments according to the invention. The example has been shown for an image input data with n pixel values, $\{f1, \ldots, fn\}$. The encoding operates on each input A and exploits the PKeys, i.e., a set of the base hypervectors data into a high-dimensional vector from the feature values for the client, where 0 and 1 in the PKeys correspond to −1 and 1 to form a bipolar hypervector ($\{-1, +1\}^D$), denoted by PKeys=$\{B1, \ldots, Bn\}$. To store the metadata with negligible impact on the encoded hypervector, metadata is injected into small segments of an encoded hypervector by exploiting another set of hypervectors, $\{M1, \ldots, Mk\}$, referred to as a metavector shown as B in FIG. 5. The encoded data (including the encoded original data and the metadata) is sent to the cloud to perform the HD learning.

SecureHD can also decode encoded data received from the cloud. In some embodiments, the encoded data received from the cloud can be an inference generated by the trained model (operated in the cloud) in response to a hypervector sent by the client, or can be a trained (or incrementally trained model) generated in the cloud in response to data from the client. In some embodiments, operations described herein can be applicable to other applications carried out in the cloud (such as cloud storage etc.). This procedure may start with identifying the injected metadata (C in FIG. 5). Based on the injected metadata, SecureHD can determine the base hypervectors that will be used in the decoding. Then, SecureHD can reconstruct the original data from the decoded data (D in FIG. 5). In some embodiments, the data recovery procedure utilizes a value extraction technique, which can retrieve both metadata and data.

As further shown in FIG. 5, in some embodiments SecureHD encodes input data into hypervectors, where an original data point has n features, where each feature can be associated with a hypervector. The features can have discrete value (e.g., alphabets in text), in which we perform a straight mapping to hypervectors, or can have a continuous range, in which case the values can be quantized and then mapped similar to discrete features. The goal is to encode each feature vector to a hypervector that has D dimensions, e.g. D=10,000.

To differentiate each feature, a PKey is exploited for each feature value, i.e., $\{B1, B2, \ldots, Bn\}$, where n is the feature size of an original data point. Since the PKeys are generated from the random bit streams, the similarity of different base hypervectors are nearly orthogonal:

$$\delta(B_i, B_j) \simeq 0 \ (0 < i, j \leq n, i \neq j).$$

The orthogonality of feature hypervectors is ensured as long as the hypervector dimension, D, is large enough compared to the number of features (D≫n) in the original data.

Different features are combined by multiplying feature values with the corresponding base hypervector, $Bi \in \{-1, +1\}^D$ and adding them for all the features. For example, where fi is a feature value, the following equation represents the encoded hypervector, H:[1]

$$H = f_1 * B_1 + f_2 * B_2 + \ldots + f_n * B_n.$$

If two original feature values are similar, their encoded hypervectors are also similar, thus providing the learning capability for the cloud without any knowledge for the PKeys. It will be understood that with this encoding scheme, although an attacker may intercept sufficient hypervectors, the upper bound of the information leakage is the distribution of the data. This aspect is due to the fact that the hypervector does not preserve any information of the feature order, e.g., pixel positions in an image, and there are extremely large combinations of values in hypervector elements which exponentially grow as n increases. In the case that n is small, e.g., n<20, extra features can be added drawn from a uniform random distribution, which does not affect the data recovery accuracy and HD computation results.

A client may receive an encoded hypervector where SecureHD processes multiple data types. In this case, to identify base hypervectors used in the prior encoding, additional information of the data identifier and metadata, such as data type (e.g., image or text) and color depth is embedded. To embed the additional metadata into hypervectors, in can be exploited considering that the HD computing is robust to small modification of hypervector elements. For example, if a data hypervector is considered as a concatenation of several partial vectors (e.g., a single hypervector with the D dimension) can be viewed as the concatenation of different d-dimensional vectors, $A_1, \ldots, A_N$:

$$H = A_1 \frown A_2 \frown \ldots \frown A_N$$

where D=N×d, and each Ai vector is called as a segment. The metadata is injected into a minimal number of segments as illustrated in FIG. 5 showing the concatenation of a hypervector to N=200 segments with d=50 dimensions.

A random d dimensional vector with bipolar values, Mi, (i.e., metavector) is generated corresponding to a metadata type. For example, M1 and M2 can correspond to the image and text types, while M3, M4, and M5 correspond to each color depth, e.g., 2-bit, 8-bit, and 32-bit. SecureHD can inject each Mi into one of the segments in the data hypervector. The metavector can be injected multiple times to better distinguish it against the values already stored in the segment. For example, if the metavector is injected into in the first segment, the following equation denotes the metadata injection procedure:

$$A'_1 = A_1 + C * M_1 + C * M_2 + \ldots + C * M_k$$

where C is the number of injections for each metavector. It will be further understood that The scalar multiplication, denoted by *, can make a hypervector that has integer elements, i.e., H $\in$ N$^D$.

In some embodiments, the feature values stored in the encoded hypervectors can be extracted. For example, assuming H=f1*B1+f2*B2+f3*B3, where Bi is a base hypervector with D dimensions and fi is a feature value, the goal of the decoding procedure is to find a fi for a given Bi and H. A possible way is to exploit the cosine similarity metric, $\delta$. For example, if we measure the cosine similarity of H and B1 hypervectors, (H, B1), the higher $\delta$ value represents higher chance of the existence of B1 in H. Thus, one method may iteratively subtract one instance of B1 from H to check when the cosine similarity is zero, i.e., $\delta$ (H', B1) where H'=H−m*B1.

Figure 6B:
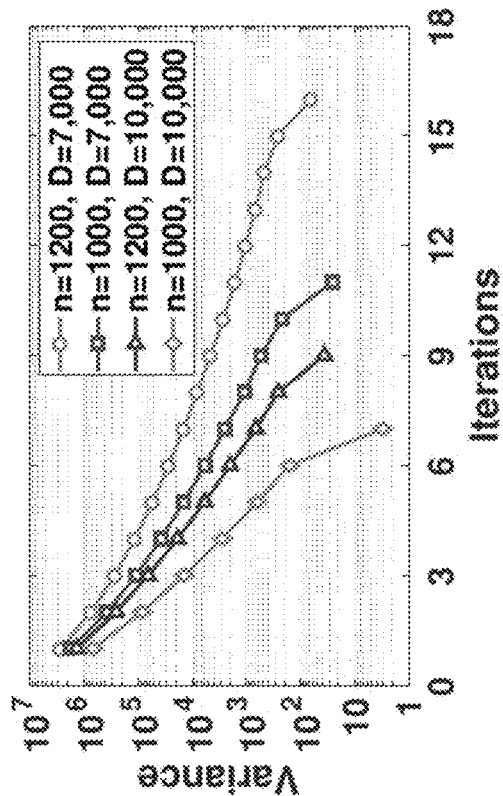
FIGS. 6A and 6B are graphs showing value extraction data in some embodiments according to the present invention.
Figure 6A:
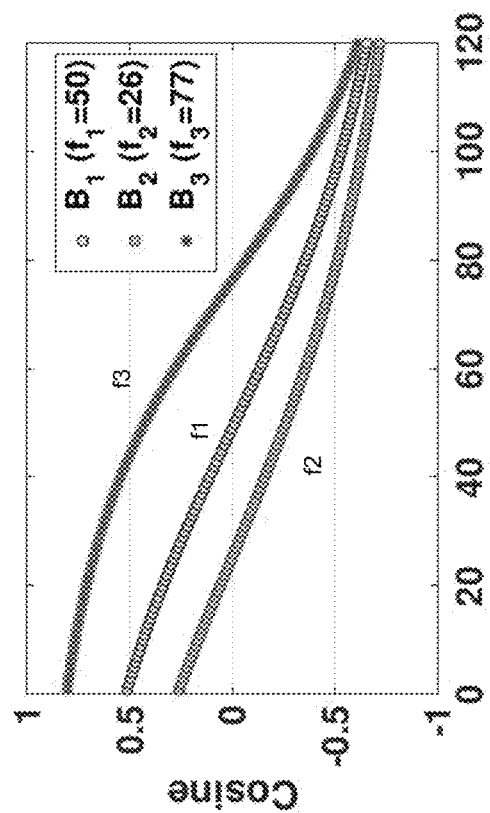

FIG. 6A shows an example for the cosine similarity for each Bi when f1=50, f2=26 and f3=77 and m changes from 1 to 120. The result shows that the similarity decreases as subtracting more instances of B1 from H. For example, the similarity is zero when m is close to fi as expected, and becomes negative value for further subtractions, since H' has the term of −B1. Regardless of the initial similarity of H with B, the cosine similarity is about zero when m is close to each feature value fi.

However, there are two main issues in the cosine similarity-based value search. First, finding the feature values in this way needs iterative procedures, slowing down the runtime of data recovery. In addition, it is more challenging when feature values are represented in floating point. Second, the cosine similarity metric may not give accurate results in the recovery. In the earlier example, the similarity of each fi is zero, when mi is 49, 29 and 78 respectively.

To efficiently estimate fi values, we exploit another approach that utilizes the random distribution of the hypervector elements. Let us consider the following equation:

$$H \cdot B_i = f_i * (B_i \cdot B_i) + \sum_{j, \forall j \neq i} f_j * (B_i \cdot B_j).$$

$B_i \cdot B_i$ is D since each element of the base hypervector is either 1 or −1, while $B_i \cdot B_j$ is about zero due to the near-orthogonal relationship. Thus, fi can be estimated with the following equation, called the value discovery metric:

$f_i \delta H \cdot B_i / D.$

This metric yields an initial estimate of all feature values, i.e., F1=If1 1, . . . , fn1l. Starting with the initial estimation, SecureHD minimizes the error through an iterative procedure.

Figure 7:
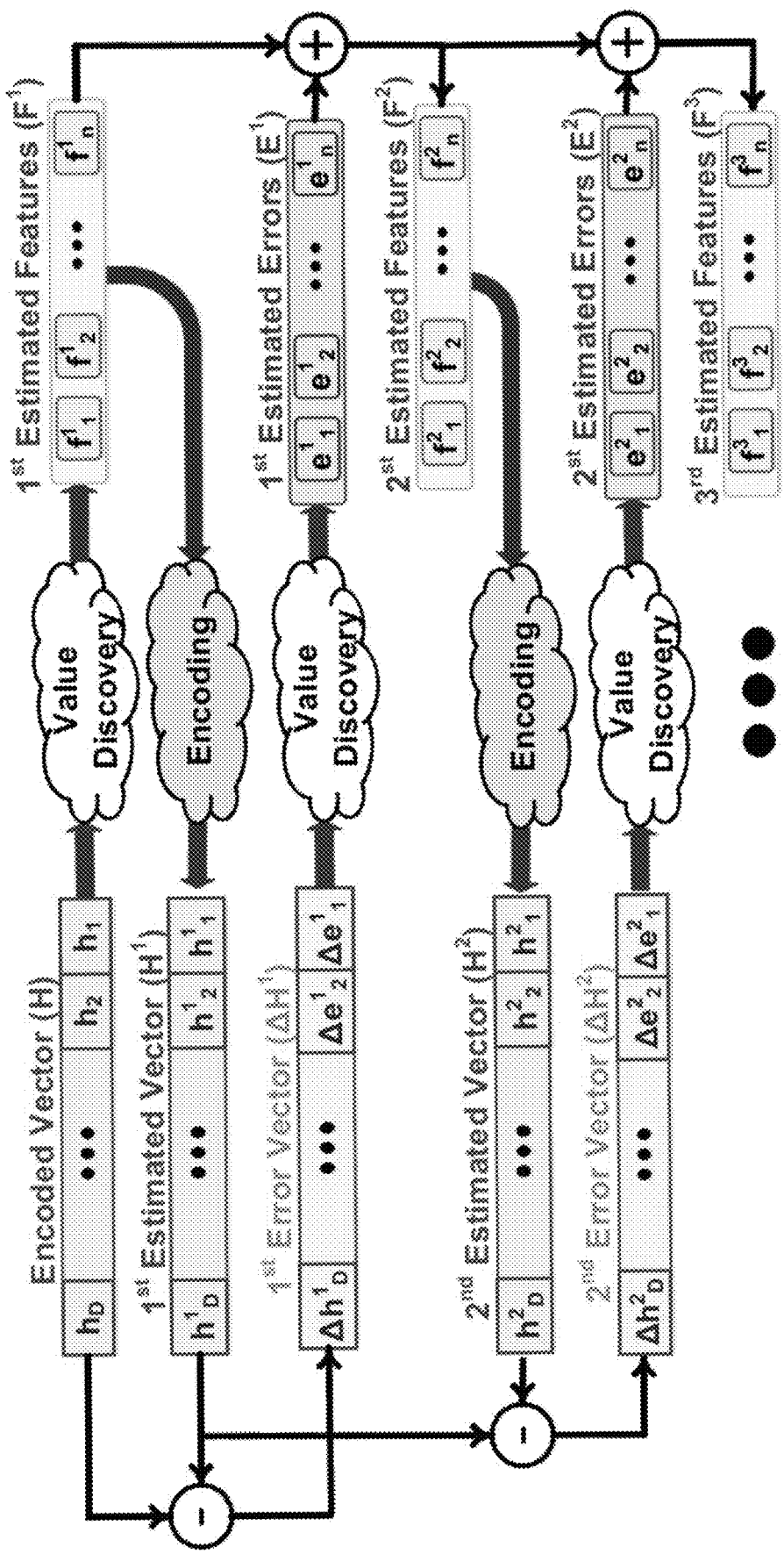
FIG. 7 is a schematic illustration of an iterative error correction procedure in some embodiments according to the present invention.

FIG. 7 shows the iterative error correction mechanism in some embodiments according to the invention. The estimated feature vector, F$^1$ can be estimated into the high dimensional space, H1{h$^1_1$, . . . , h$^1_D$}. We then compute DH$^1$=H−H$^1$, and apply the value extraction metric for DH$^1$. Since this yields the estimated error, E$^1$, in the original domain, it is added to the estimated feature vector for the better estimate of the actual features, i.e., F$^2$=F$^1$+E$^1$. This is repeated until the estimated error converges. To determine the termination condition, the variance of the error hypervector, DH$^i$, can be determined at the end of each iteration.

FIG. 6B shows the variance changes when decoding four example hypervectors. For this experiment, two feature vectors whose size is either n=1200 or 1000, were used where the feature values were uniform-randomly generated.

Each feature vector was encoded to two hypervectors with either D=7,000 or D=10,000. As shown in the results, the iterations required for accurate recovery depends on both the number of features in the original domain and hypervector dimensions. Accordingly, the ratio of the hypervector dimension to the number of features in the original domain, i.e., R=Din, may also be used herein to evaluate the quality of the data recovery for different feature sizes. The larger R ratio, the larger the retraining iterations are expected to sufficiently recover the data.

In some embodiments according to the invention, the value extraction method is utilized to recover the metadata. It is calculated how many times each metavector {M1, . . . , Mk} presents in a segment. If the extracted instances of metavector are similar to the actual C value that was injected, such metavector is considered to be in the segment. However, since the metavector has a small number of elements, i.e., d<<D dimensions, it might have a large error in finding the exact C value. Assuming that when injecting a metavector C times, the value extraction method identifies a value, $\hat{C}$, in a range of [Cmin,Cmax]. The range also includes C. If the metavector does not exist, the value $\hat{C}$ will be approximately zero, i.e., a range of [$-\varepsilon, \varepsilon$]. The amount of e depends on the other information stored in the segment.

Figure 8A:
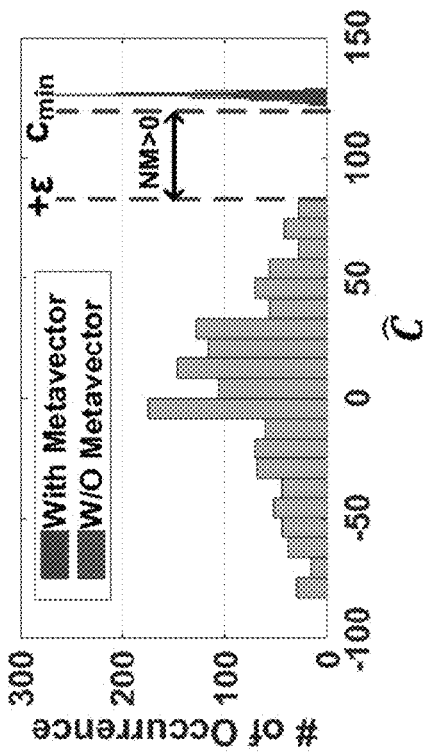
FIGS. 8A-8D are graphs showing relationships between #of metavector injections and segment size in some embodiments according to the present invention.

FIG. 8A shows the distribution of extracted values, $\hat{C}$, when injecting 5 metadata 10 times (C=10) into a single segment of a hypervector. These distributions are reported using a Monte Carlo simulation with 1500 randomly generated metavectors. The results show that the distributions of the existing and non-existing cases are overlapped, making the estimation difficult.

Figure 8B:
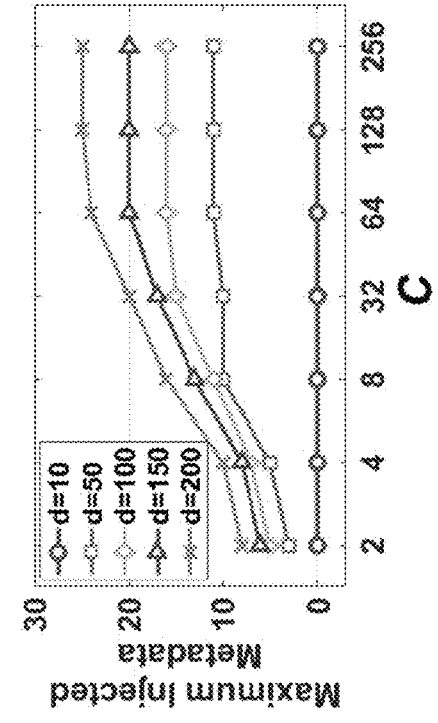
Figure 8C:
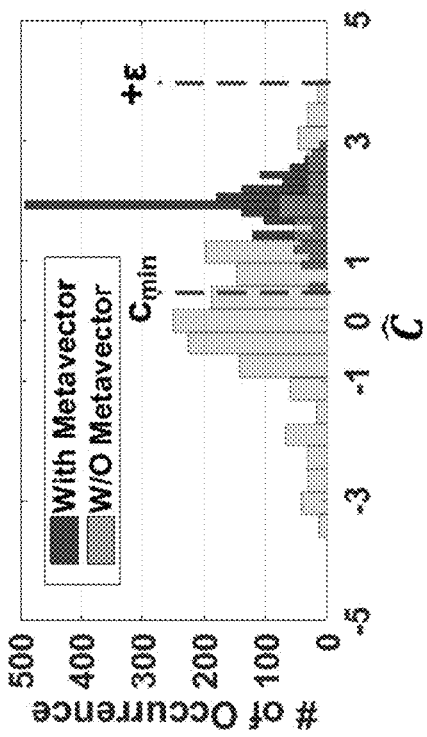
Figure 8D:
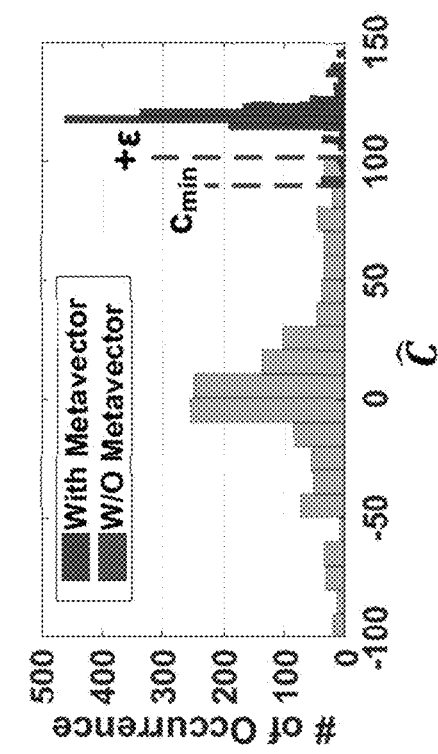

However, as shown in FIG. 8B, when using C=128, there is a clear margin between these two distributions which identify the existence of a metadata. FIG. 8C shows the distributions when 8 metadata are injected into a single segment with C=128. In that case, two distributions overlap, i.e., there are a few cases when the metadata cannot be fully recovered. C is determined so that the distance between Cmin and $\varepsilon$ is larger than 0. The distance is defined as the noise margin, NM=Cmin−$\varepsilon$. FIG. 8D shows how many metavectors can be injected for different C values. The results show that the number of meta vectors that can be injected saturates for larger C values. Since the large number of C and segment size d also have higher chance to influence on the accuracy of the data recovery, in some embodiments C=128 and d=50 can be used and were used for the evaluation of embodiment according to the invention.

After recovering the metadata, SecureHD can recognize the data types and choose the base hypervectors for decoding. The metadata is subtracted from the encoded hypervector and decoding of the main data begins. SecureHD utilizes the same value extraction method to identify the values for each base hypervector. The quality of data recovery depends on the dimension of hypervectors in the encoded domain (D) and the number of features in the original space (n), i.e., R=D/n defined herein. The larger the R value, the higher accuracy that can be achieved during the data recovery at the expense of the size of encoded data. For instance, when storing an image with n=1000 pixels in a hypervector with D=10,000 dimensions (R=10), it is expected to achieve high accuracy for the data recovery. In evaluation, it was observed that, with R=7, it is enough to ensure lossless data recovery in the worst case.

Figure 9A:
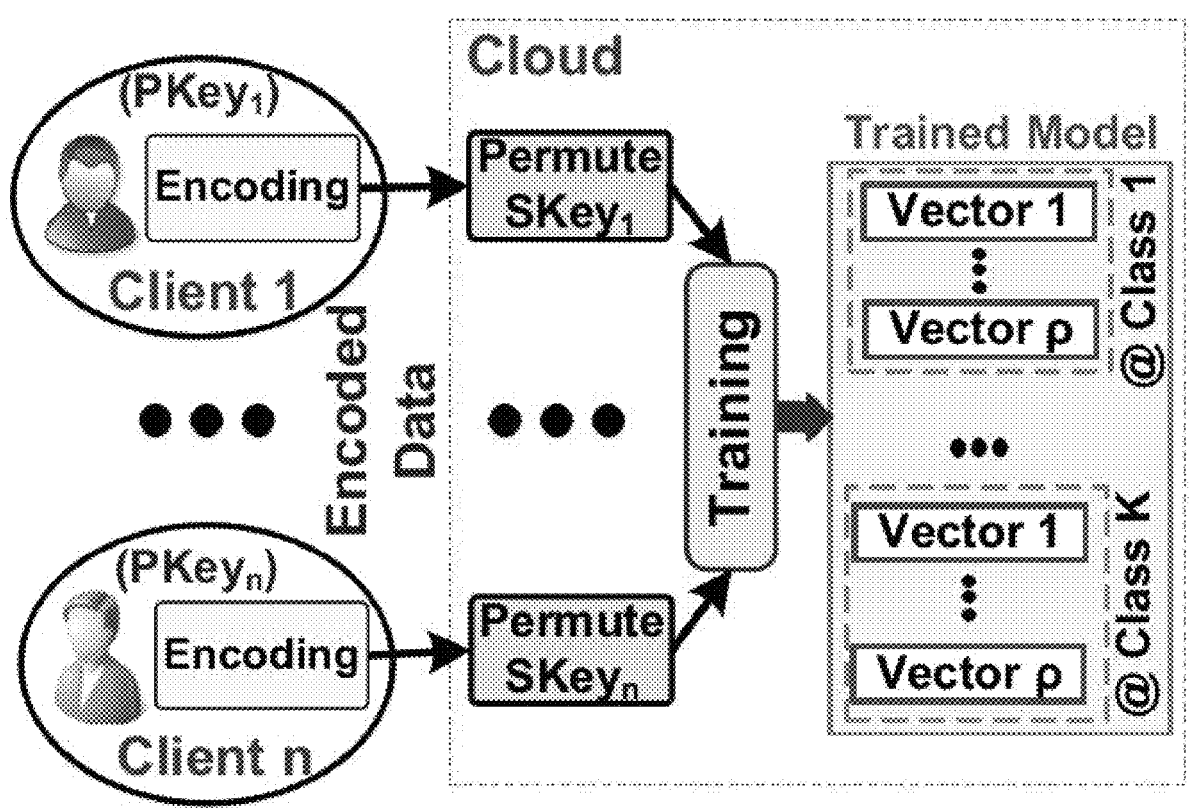
FIGS. 9A and 9B are schematic illustrations of centralized and federated classification systems in SecureHD in some embodiments according to the present invention.
Figure 9B:
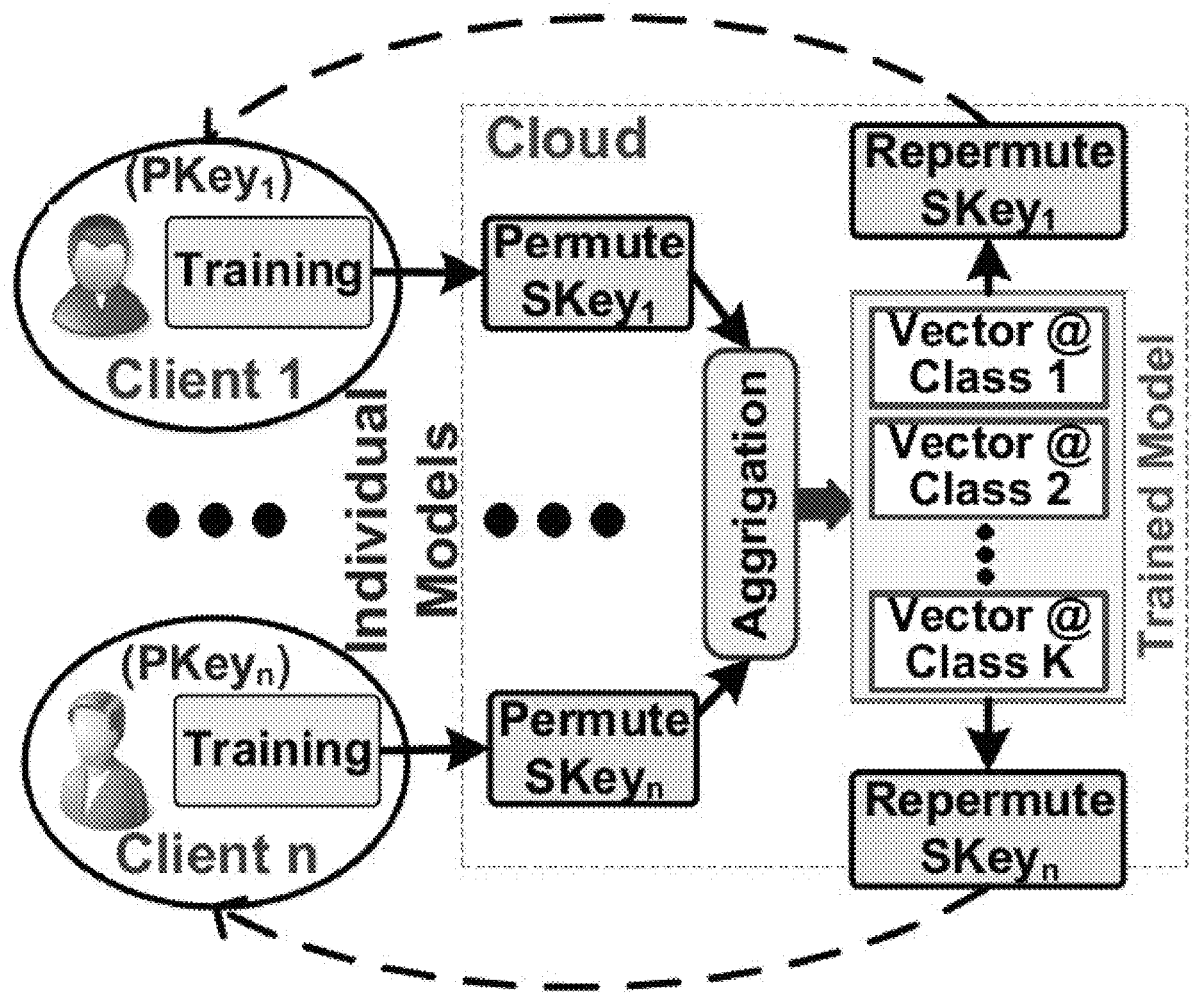

FIG. 9 shows the HD-based collaborative learning in the high-dimensional space. In some embodiments according to the present invention two training approaches can be used:

centralized training and federated training, which performs classification learning with a large amount of data provided by many clients. The cloud can perform the training procedures using the encoded hypervectors without explicit decoding. It only needs to permute the encoded data using the SKey of each client. Note that the permutation aligns the encoded data on the same GKey base, even though the cloud does not have the GKeys. It reduces the cost of the learning procedure, and the data can be securely classified even on the untrustworthy cloud. The training procedure creates multiple hypervectors as the trained model, where each hypervector represents the pattern of data points in one class, which are referred to as class hypervectors.

In centralized training, the clients send the encoded hypervectors to the cloud. The cloud permutes them with the SKeys, and a trainer module combines the permuted hypervectors. The training is performed with the following sub-procedures.

Initial training: At the initial stage, it creates the class hypervectors for each class. As an example, for a face recognition problem, SecureHD creates two hypervectors representing "face" and "non-face". These hypervectors are generated with element-wise addition for all encoded inputs which belong to the same class, i.e., one for "face" and the other one for "non-face".

Multivector expansion: After training the initial HD model, the initial model is expanded with a cross validation, so that each class has multiple hypervectors of the size of $\rho$. In some embodiments according to the invention idea, when training with larger data, it may need to capture more distinct patterns with different hypervectors. To this end, the cosine similarity can be checked for each encoded hypervector again to the trained model. If an encoded data does not correctly match with its corresponding class, it means that the encoded hypervector has a distinct pattern as compared to the majority of all the inputs in the class. For each class, a set is created that includes such mismatched hypervectors and the original model. Two hypervectors are chosen, whose similarity is the highest among all pairs in the set, and update the set by adding the selected two into a new hypervector. This is repeated until the set includes only p hypervectors.

Retraining: As the last step, the HD model is iteratively adjusted over the same dataset to give greater weights for misclassified samples that may often happen in a large dataset. The similarity is checked for each encoded hypervector again with all existing classes. Assuming that $C^p_k$ is one of the class hypervectors belonging to $k^{th}$ class, where p is the index of multiple hypervectors in the class, if an encoded hypervector Q belonging to $i^{th}$ class is incorrectly classified to Cmiss j, the model is updated by:

$$C_j^{miss}=C_j^{miss}-\alpha Q \text{ and } C_i^{\tau}=C_i^{\tau}+\alpha Q$$

where $\tau=_t\delta(C_i^t,Q)$ and $\alpha$ is a learning rate in a range of [0.0, 1.0]. In other words, in the case of misclassification, we subtract the encoded hypervector from the class which it is incorrectly classified to, while adding it to the class hypervector which has the highest similarity in the correct class. This procedure is repeated for predefined iterations, and the final class hypervectors are used for the future inference.

As appreciated by the present inventors, in some embodiments the clients may not have enough network bandwidth to send every encoded hypervector. To address this issue, the clients may individually train initial models, i.e., one hypervector for each class, and only using their own encoded hypervectors (i.e., not using hypervectors of other clients). Then each client may transmit the respective partially trained model to the cloud. Once the cloud receives the initial models of all the clients, it permutes the models with the SKeys and performs element-wise additions to create a global model, Ck, for each $k^{th}$ class.

Since the cloud only knows the initial models for each client, the multivector expansion procedure is not performed in this approach, but the retraining procedure described herein can still be performed. To this end, the cloud re-permutes the global model and sends it back to each of the clients. With the global model, each client performs the same retraining procedure. Assuming that $C^{ei}_k$ is the retrained model by the ith client, after the cloud aggregates all $C^{-i}k$ with the permutation, the cloud system updates the global models by $Ck=\Sigma iC^{ei}_k-(n-1)*Ck$, which is repeated for the predefined iterations. This approach allows the clients to send the trained class hypervectors only for each retraining iteration, thus significantly reducing the network usage.

With the class hypervectors generated by either approach, the inference operation can be performed in any device including the cloud and clients. For example, the cloud can receive an encoded hypervector from a client, and permute the dimension with the SKey in the same way that it performed in the training procedure. Then, it checks cosine similarity of the permuted hypervector to all trained class hypervectors to label the encoded hypervector with the corresponding class to the most similar class hypervector. In the case of the client-based inference, once the cloud sends re-permuted class hypervectors to a client, the client can perform the inference for its encoded hypervector with the same similarity check.

The following material describe evaluations performed to validate and quantify the operation of embodiments according to the present invention. The evaluation of the SecureHD framework including encoding, decoding, and learning in high-dimensional space was performed using C++. The system was evaluated on three different platforms: Intel i7 7600 CPU with 16 GB memory, Raspberry Pi 3, and Kintex-7 FPGA KC705. A network simulator, NS-3 [30], was used for a large-scale simulation. FPGA timing and the functionality of the encoding and decoding was verified by synthesizing Verilog using Xilinx Vivado Design Suite. The synthesis code was been implemented on the Kintex-7 FPGA KC705 Evaluation Kit. The efficiency of the proposed SecureHD was compared with SEAL, the state-of-the-art C++ implementation of a homomorphic library, Microsoft SEAL. For SEAL, default parameters were used: polynomial modulus of n=2048, coefficient modulus of q=128-bit, plain modulus of t=1<<8, noise standard deviation of 3.9, and decomposition bit count of 16. The SecureHD framework was evaluated with real-world datasets including human activity recognition, phone position identification, and image classification. Table I shown below summarizes the evaluated datasets:

TABLE I

DATASETS (n: FEATURE SIZE, K: NUMBER OF CLASSES)

| | n | K | Data Size | Train Size | Test Size | Description/State-of-the-art Model |
|---|---|---|---|---|---|---|
| MNIST | 784 | 10 | 220 MB | 60,000 | 10,000 | Handwritten Recognition/DNN |
| ISOLET | 617 | 26 | 19 MB | 6,238 | 1,559 | Voice Recognition/DNN |
| UCIHAR | 561 | 12 | 10 MB | 6,213 | 1,554 | Activity recognition(Mobile)/DNN |
| PAMAP2 | 75 | 5 | 240 MB | 611,142 | 101,582 | Activity recognition(IMU)/DNN |
| EXTRA | 225 | 4 | 140 MB | 146,869 | 16,343 | Phone position recognition/AdaBoost |
| FACE | 608 | 2 | 1.3 GB | 522,441 | 2,494 | Face recognition/Adaboost |

The tested benchmarks ranged from relatively small datasets collected in a small IoT network, e.g., PAMAP2, to a large dataset which includes hundreds of thousands of images of facial and non-facial data. The classification accuracy of SecureHD was also compared for the datasets with a conventional learning models shown in the Table I.

As described herein, SecureHD performs one-time key generation to distribute the PKeys to each user using the MPC and GC protocols. Table II shown below lists the number of required logic gates evaluated in the protocol and the amount of required communication between clients:

TABLE II

OVERHEAD FOR KEY GENERATION AND DISTRIBUTION

| | | Phases | | | |
|---|---|---|---|---|---|
| | | Phase 1 | | | |
| | # of Clients | 10 | 50 | 100 | Phase 2 |
| D = 1000 | # of Gates | 11K | 51K | 101K | 8.9K |
| | Communication | 7.1 MB | 160 MB | 650 MB | 284 MB |
| D = 5000 | # of Gates | 55K | 255K | 505K | 56.4K |
| | Communication | 35 MB | 813 MB | 3.24 GB | 1.8 MB |
| D = 10,000 | # of Gates | 110K | 510K | 101K | 122.9K |
| | Communication | 70.34 MB | 1.64 GB | 6.46 GB | 3.93 MB |

This overhead comes mostly from the first phase of the protocol, since the second phase has been simplified with the two-party GC protocol. The cost of the protocol is dominated by network communication. In the simulation conducted under our in-house network of 100 Mbps, required about 9 minutes to create D=10,000 keys for 100 participants. Note that the runtime overhead was negligible since the key generation happens only once before all future computation.

Figures 10A, 10B:
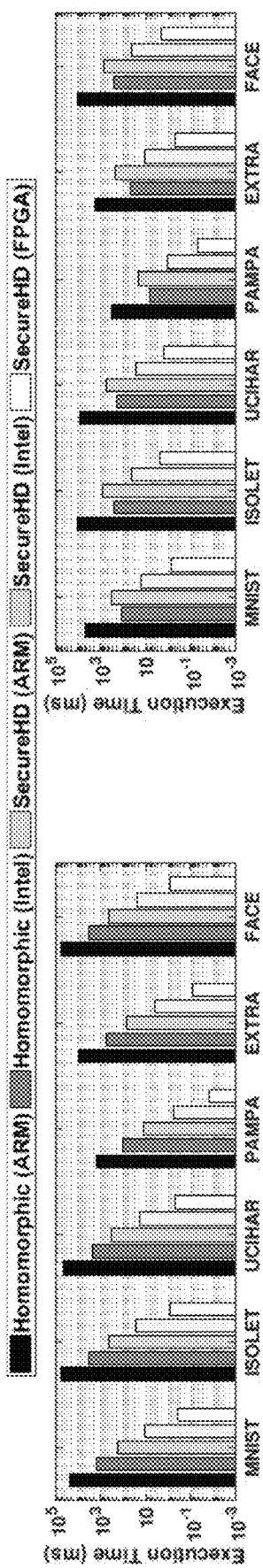
FIGS. 10A and 10B are graphs showing comparisons of SecureHD efficiency to homomorphic algorithm in encoding and decoding in some embodiments according to the present invention.

The encoding and decoding procedure running on each client was also evaluated. The efficiency of SecureHD was compared with the Microsoft SEAL. Both the SecureHD framework and homomorphic library were run on ARM Cortex 53 and Intel i7 processors. FIGS. 10A and 10B show the execution time of the SecureHD and homomorphic library to process a single data point for Homomorphic (ARM), Homomorphic (Intel), SecureHD (ARM), SecureHD (Intel), and SecureHD (FPGA) results shown left to right. For SecureHD, R=7 was used to ensure 100% data recovery rate for all benchmark datasets. Evaluation shows that SecureHD achieved on average 133× and 14.7× (145.6× and 6.8×) speedup for the encoding and decoding, respectively, as compared to the homomorphic technique running on the ARM architecture (Intel i7). The encoding of SecureHD running on embedded devices (ARM) was still 8.1× faster than the homomorphic encryption running on the high-performance client (Intel i7). The SecureHD efficiency was also compared on the FPGA implementation. It was observed that the encoding and decoding of SecureHD achieved 626.2× and 389.4× (35.5× and 20.4×) faster execution as compared to the SecureHD execution on the ARM (Intel i7). For example, the proposed FPGA implementation was able to encode 2,600 data points and decode 1,335 for the MNIST images in a second.

Based on the SecureHD, clients can share the information with the cloud in a secure way, such that the cloud cannot understand the original data while still performing the learning tasks. Along with the proposed two learning approaches, we also evaluated a conventional HD classification approach, called one-shot HD model, which trains the model using a single hypervector per class with no retraining. For the centralized training, two models were trained, one that has 64 class hypervectors for each class and the other one that has 16 for each class, referred to as Centralized-64 and Centralized-16. The retraining procedure was performed for 100 times with $\alpha=0.05$, since the classification accuracy was converged with this configuration for all the benchmarks.

Figure 11:
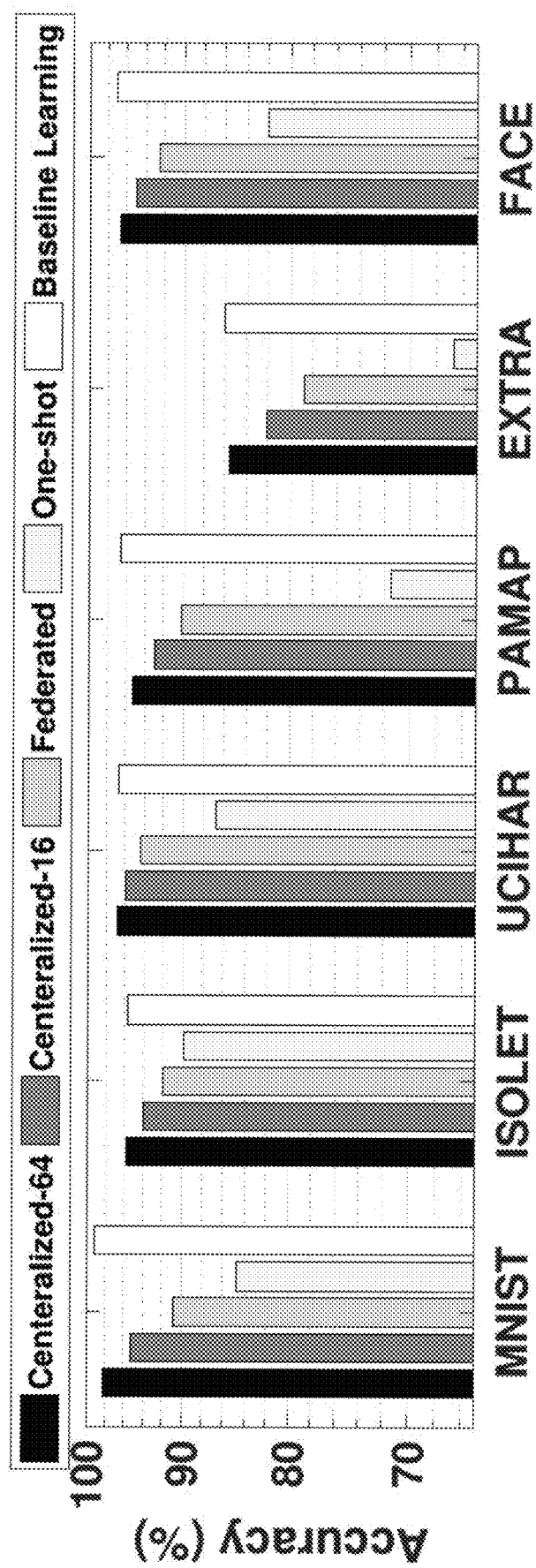
FIG. 11 is a graph showing SecureHD classification accuracy in some embodiments according to the present invention.

FIG. 11 shows the classification accuracy of the SecureHD for the different benchmarks with Centralized-64, Centralized-16, Federated, One-shot, and Baseline learning shown left to right. The results show that the centralized training approach achieved high classification accuracy comparable to DNN models. It was also observed that, by training more hypervectors per class, it can provide higher classification accuracy. For example, for the federated training approach, which does not use multivectors, the classification accuracy was 90% on average, which was 5% lower than the Centralized-64. As compared to the state-of-the-art one-shot HD model which does not retrain models, Centralized-64 achieved 15.4% higher classification accuracy on average.

As described herein, the proposed learning method is designed to effectively handle a large amount of data. To understand the scalability of the proposed learning method, how the accuracy changed was evaluated when the training data came from different numbers of clients, with simulation on NS-3 [30]. In this experiment, three datasets were used, PAMAP2, EXTRA, and FACE, which included information of where data points are originated. For example, PAMAP2 and EXTRA were gathered from 7 and 56 individual users. Similarly, the FACE dataset includes 100 clients that have different facial images each other. FIGS. 12A and B show the accuracy changes for the centralized and federated training approaches. The result shows that increasing the number of clients improved the classification accuracy by training with more data. Furthermore, as compared to the one-shot HD model, the two proposed approaches showed better scalability in terms of accuracy. For example, the accuracy difference between the proposed approach and the one-shot model grew as more clients engage in the training. Considering the centralized training, the accuracy difference for the FACE dataset was 5% when trained with one client, while it was 14.7% for the 60-client case. This means that the multivector expansion and retraining techniques are effective to learn with a large amount of data.

It was also verified that the SecureHD learning methods work with constrained network conditions that often happen in IoT systems. In the network simulation, the worst-case network condition was assumed, i.e., all clients share the bandwidth of a standard WiFi 802.11 network. Note that it was a worst-case scenario and in practice each embedded device may not share the same network. FIG. 12C shows that the network bandwidth limits the number of hypervectors that can be sent for each second as multiple clients involve the learning task. For example, a network with 100 clients can send the lower number of hypervectors by 23.6× than a single-client case.

As described herein, the federated learning can be exploited to overcome the limited network bandwidth at the expense of the accuracy loss. Another solution is to use a reduced dimension in the centralized learning. As shown in FIG. 12C, when D=1,000, clients can send the data to the cloud with 353 samples per second, which is 10 times higher than the case of D=10,000. FIG. 12D shows how the learning accuracy changes for different dimension settings. The results show that reducing the hypervector dimensions to 4000 and 1000 dimensions has less than 1.4% and 5.3% impact on the classification accuracy. This strategy gives another choice of the trade-off between accuracy and network communication cost.

Figure 13B:
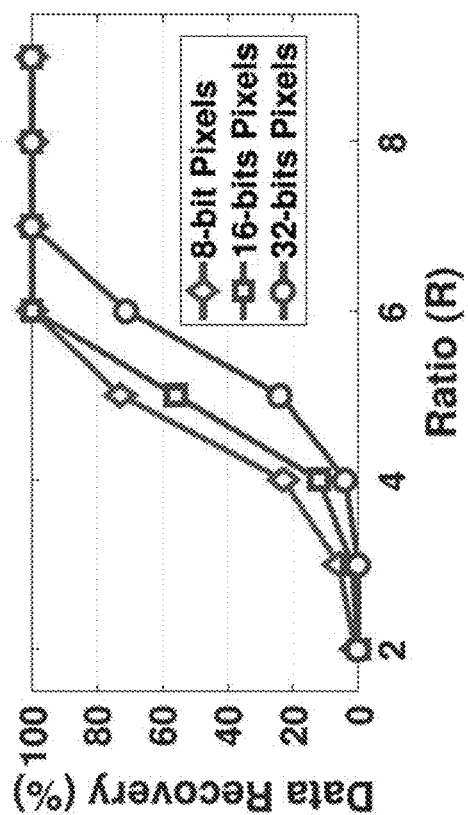
FIGS. 13A and 13B are graphs showing data recovery accuracy of SecureHD in some embodiments according to the present invention.
Figure 13A:
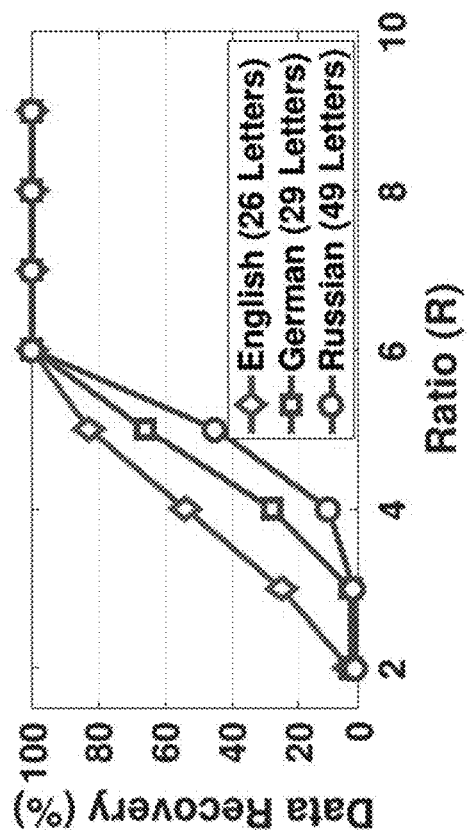

As described herein, the SecureHD framework provides a decoding method for the authorized user that has the original Pkeys used in the encoding. FIG. 13A shows the data recovery rate on images with different pixel sizes. To verify the proposed recovery method in the worst case scenario, 1000 images were created whose pixel values were randomly chosen, and reported the average error when the 1000 images were mapped to D=10,000 dimension. The x-axis shows the ratio R, i.e., D/n where the number of hypervector dimension (D) to the number of pixels (n) in an image. The data recovery rate depends on the precision of the pixel values. Using high-resolution images, SecureHD uses a larger R value to ensure 100% accuracy. For instance, for images with 32-bit pixel resolution, SecureHD can achieve 100% data recovery using R=7, while lower resolution images (e.g., 16 and 8-bits) requires R=6 to ensure 100% data recovery. Evaluation showed that embodiments according to the invention can decode any input image with 100% data recovery rate using R=7. This means that data can be can securely encoded with 4× smaller size compared to the homomorphic encryption library which increases the data size by 28 times through the encryption.

The SecureHD framework was also evaluated with a text dataset written in three different European languages. FIG. 13B shows the accuracy of data recovery for the three languages. The x-axis is the ratio between the length of hypervectors to the number of characters in the text when D=10,000. SecureHD assigned a single value to each alphabet letter and encodes the texts with the hypervectors. Since the number of characters in these languages is less than 49, SecureHD used at most 6 bits to represent each alphabet. In terms of the data recovery, it is equal to encoding the same size image with the 6-bit pixel resolution. Evaluation showed that SecureHD can provide 100% data recovery rate with R=6.

FIG. 14 shows the quality of the data recovery for two example images. The Lena and MNIST image have 100× 100 pixels and 28×28 pixels, respectively. The encoding maps the input data to hypervectors with different dimensions. For example, the Lena image with R=6 means that the image has been encoded with D=60,000 dimensions. Evaluation showed that SecureHD achieved lossless data recovery on Lena photo when R≥6, while using R=5 and R=4 the data recovery rates are 93% and 68%. Similarly, R=5 and R=4 provide 96% and 56% data recovery for the MNIST images.

As described herein, the metadata injection method is performed such that it ensures 100% metadata recovery and it has minimal impacts on the original hypervector for the learning and data recovery. The solid line in FIG. 15A shows the noise margin when injecting multiple metavectors into a single segment of hypervector when the number of elements in the segment is chosen by 50(=d). The results showed the worst case for 5000 Monte Carlo simulation. The results show that each segment can store 6 metavectors at most to take a positive noise margin that ensures 100% metadata recovery. The dotted line shows the data recovery error rate for different numbers of metavectors injected into a single segment. Evaluation shows that adding 6 metavectors has less than 0.005% impact on the data recovery rate.

Since the number of metavectors which can be injected in one segment is limited, it may be needed to distribute the metadata in different segments. FIG. 15B presents the impact of the metadata injection on the data recovery error rate with this method. When 6 metadata were injected into each of all 200 segments, i.e., 1200 metavectors in total, the impact on the recovery accuracy is still minimal, i.e., less than 0.12%.

Figure 16:
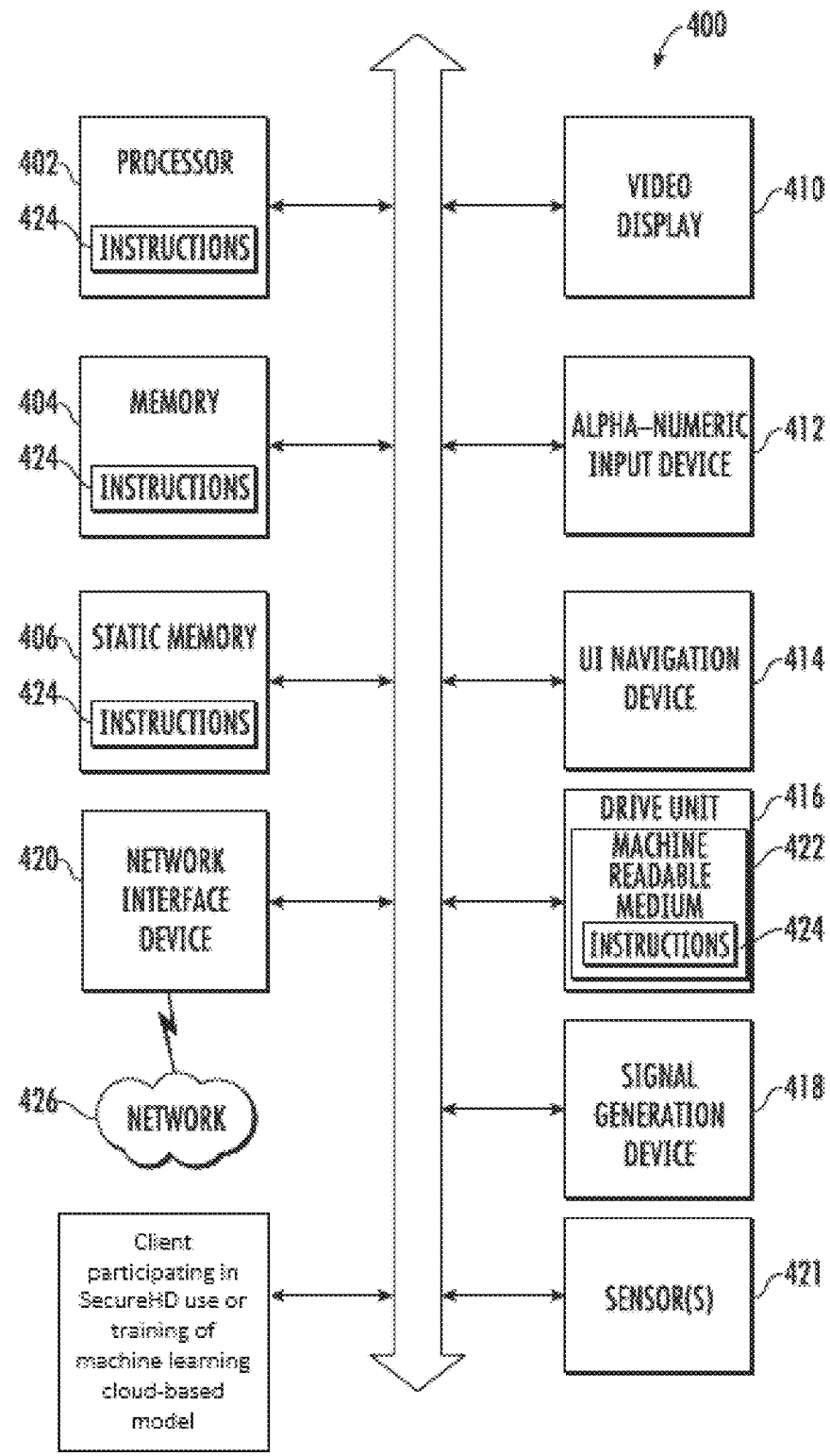
FIG. 16 is a block diagram of a client device that can be used in the SecureHD system in some embodiments according to the present invention.

FIG. 16 is a block diagram illustrating an example of a machine upon which one or more aspects of embodiments of the present invention can be implemented. For example the block diagram of FIG. 16 illustrates a computing system that can be used to perform processor-executable instructions represented by non-transitory processor-readable media to carry out the operations shown in some of the embodiments according to the invention. An aspect of an embodiment of the present invention includes, but not limited thereto, a system Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, later, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be in a single location (e.g., within a home environment, an office environment or as a server farm), while in other examples the processors can be distributed across several locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments. In an example, the machine 400 can operate as a standalone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term "machine" shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 810, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

The terminology used herein is for the purpose of describing embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems, and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

It will be understood that the operations and operators described herein, such as Xor operations, used to carry out the hypervector processing may be performed using other operators and/or operations and are to be considered within the scope of the present invention.

While the foregoing is directed to aspects of the present disclosure, other and further embodiments of the disclosure may be devised without departing from the basic scope thereof, and the scope thereof is determined by the claims that follow.

What is claimed:

1. A computing system comprising:
a plurality of clients located outside a cloud-based computing environment, each of the clients is configured to encode respective original data with a respective unique secret key to generate data hypervectors that encode the original data; and
a collaborative machine learning system operating in the cloud-based computing environment and operatively coupled to the plurality of clients, the collaborative machine learning system configured to operate on the data hypervectors that encode the original data to train a machine learning model operated by the collaborative machine learning system or to generate an inference from the machine learning model, wherein the original data from each of the plurality of clients is used to train the machine learning model or to generate the inference from the machine learning model.

2. The computing system of claim 1 further comprising:
a key generation server located outside the plurality of clients and operatively coupled to the plurality of clients and to the cloud-based computing environment, wherein each of the respective unique secret keys distributed to the clients is generated using a single global base hypervector (Gkey).

3. The computing system of claim 2 wherein the Gkey is generated using a different random string of first data provided by each of the clients to the key generation server.

4. The computing system of claim 3 wherein each different random string of first data provided by each of the clients is X-ored together to generate the GKey.

5. The computing system of claim 4 wherein the Gkey is X-ored with a different random string of second data provided by each of the clients to the key generation server to provide a respective unique secret key to each client and stored in the cloud-based computing environment.

6. The computing system of claim 5 wherein the key generation server is configured to receive each respective unique secret key from the cloud-based computing environment and is configured to X-or each respective unique secret key with the different random string of second data from the respective client to provide the Gkey for each client at the key generation server.

7. The computing system of claim 6 wherein the key generation server is configured to permute the Gkey using a respective Shuffle Key (SKey) for each of the clients to provide the respective unique secret key to each of the respective clients.

8. The computing system of claim 7 wherein the key generation server is configured generate additional respective unique secret keys for each client by performing a single rotational shift on the Gkey for each additional respective unique secret key generated.

9. The computing system of claim 1 wherein each respective unique secret key of the plurality of clients includes a plurality of base hypervectors configured; and
each of the clients is configured to encode the respective original data using the base hypervectors to generate the data hypervectors transmitted to the collaborative machine learning system.

10. The computing system of claim 9 wherein the original data comprises a plurality of features.

11. The computing system of claim 10 wherein each of the clients is configured to multiply a respective one of the plurality of features with a respective one of the plurality of base hypervectors to provide a plurality of feature hypervectors.

12. The computing system of claim 11 wherein each of the clients is configured to add the plurality of feature hypervectors together to provide the data hypervector.

13. The computing system of claim 1 wherein the data hypervectors encoding the original data further includes metadata of the original data.

14. The computing system of claim 13 wherein the metadata further comprises a plurality of metadata types; and
each client is configured to generate a plurality of random metavectors, wherein each random metavector corresponds to one of the metadata types, wherein each client is configured to multiply each random metavector associated with the original data by an injection constant to provide an injection metavector.

15. The computing system of claim 14 wherein each client is configured to add the injection metavector to a segment of the hypervector encoding the original data to which the metadata in the injection metavector corresponds to provide the data hypervector.

16. The computing system of claim 12 wherein each client is further configured to decode the data hypervector by estimating the plurality of features using a value discovery metric operating on the plurality of base hypervectors and the data hypervector to provide estimated features.

17. The computing system of claim 16 wherein each client is further configured to:
(a) encode the estimated features to provide an estimated features vector;
(b) subtract the estimated features vector from the data hypervector to provide an error vector;
(c) perform the value discovery metric on the error vector to provide first estimated errors;
(d) add the first estimated errors to the estimated features to provide second estimated features; and
(e) repeat operations (a)-(d) using the second estimated features as the estimated features at a start of each iteration until a variance for the error vector reaching a pre-determine termination condition.

18. A computing system comprising:
a plurality of clients located outside a cloud-based computing environment, each of the clients being configured to encode respective original data with a respective unique secret key to generate data hypervectors that encode the original data; and
a plurality of machine learning systems, wherein each of the machine learning systems operates on a respective one of the plurality of clients and configured to operate only on the data hypervectors that encode the original data from the respective client, to train a machine learning model operated by the respective client; and
a collaborative machine learning system operating in the cloud-based computing environment and operatively coupled to the plurality of clients, the collaborative machine learning system configured to aggregate all of the machine learning models operated by the plurality of clients to provide a global machine learning model in the cloud-based computing environment.

19. The computing system of claim 18 wherein the collaborative machine learning system is further configured to provide the global machine learning model to each of the plurality of machine learning systems.

\* \* \* \* \*

UNITED STATES PATENT AND TRADEMARK OFFICE
CERTIFICATE OF CORRECTION

PATENT NO. : 11,599,832 B2
APPLICATION NO. : 16/915643
DATED : March 7, 2023
INVENTOR(S) : Imani et al.

It is certified that error appears in the above-identified patent and that said Letters Patent is hereby corrected as shown below:

On the Title Page

(56) References Cited, p. 2: Please correct "2022/0108177 04/2022 Sam" to read -- 2022/0108177 04/2022 Samek --

In the Specification

Column 5, Line 33: Please correct "A*B" to read -- A$*$B --
       Line 41: Please correct "(A*B,A)≈0" to read -- (A$*$B,A)≈0 --

Column 8, Line 50: Please correct "$H = A_1 \frown A_2 \frown \cdots \frown A_N$" to read -- $\mathbf{H} = \mathbf{A}_1 \frown \mathbf{A}_2 \frown \cdots \frown \mathbf{A}_N$ --

Column 9, Line 43: Please correct "Bi·Bi" to read -- Bi•Bi --

Column 10, Line 7: Please correct "R=Din" to read -- R=D/n --

Column 11, Line 44: Please correct "only p hypervectors" to read -- only ρ hypervectors --

Signed and Sealed this
Eighteenth Day of April, 2023

*Katherine Kelly Vidal*
Katherine Kelly Vidal
*Director of the United States Patent and Trademark Office*

Column 13, Table II: Please replace Table II in its entirety to read as follows:

TABLE II
OVERHEAD FOR KEY GENERATION AND DISTRIBUTION

| Phases | | Phase 1 | | | Phase 2 |
|---|---|---|---|---|---|
| # of Clients | | 10 | 50 | 100 | |
| D=1000 | # of Gates | 11K | 51K | 101K | 8.9K |
| | Communication | 7.1MB | 160MB | 650MB | 284MB |
| D=5000 | # of Gates | 55K | 255K | 505K | 56.4K |
| | Communication | 35MB | 813MB | 3.24GB | 1.8MB |
| D=10,000 | # of Gates | 110K | 510K | 101K | 122.9K |
| | Communication | 70.34MB | 1.64GB | 6.46GB | 3.93MB |